United States Patent

[11] 3,568,719

| [72] | Inventor | Marsilio Bonomi |
| | | Via G. Prati 6, Brescia, Italy |
| [21] | Appl. No. | 809,697 |
| [22] | Filed | Mar. 24, 1969 |
| [45] | Patented | Mar. 9, 1971 |
| [32] | Priority | Mar. 26, 1968 |
| [33] | | Italy |
| [31] | | 2732A/68 |

[54] MIXING UNIT FOR FAUCETS
10 Claims, 5 Drawing Figs.

| [52] | U.S. Cl. | 137/636.4, 137/607 |
| [51] | Int. Cl. | F16k 19/00 |
| [50] | Field of Search | 137/636, 636.4, 637.4, 607 |

[56] References Cited
UNITED STATES PATENTS

| 321,913 | 7/1885 | Prusmann | 137/637.4 |
| 3,324,879 | 6/1967 | Bucknell | 251/325X |
| 3,342,214 | 9/1967 | Panerai | 137/636.4 |
| 3,414,018 | 12/1968 | Eversman | 137/636.4X |
| 3,460,570 | 8/1969 | Bucknell | 137/636.4X |

FOREIGN PATENTS

| 55,884 | 2/1939 | Denmark | 137/637.4 |

*Primary Examiner*—Clarence R. Gordon
*Attorney*—Clario Ceccon

ABSTRACT: A mixing unit for two different fluids includes an angularly, but not axially movable member for selectively discharging either one or both fluids. The mixing unit may be used in a faucet having a sleeve that is axially movable between open and closed positions.

PATENTED MAR 9 1971 3,568,719

MIXING UNIT FOR FAUCETS

This invention relates generally to faucet valves and more particularly to an improved valve means for mixing and/or selecting different fluids for discharge.

Valve units for mixing hot and cold water from faucets are well known in the prior art. However, the known mixing valves are of complex construction and usually do not permit a variation or change in the type of water that is discharged until the faucet is first closed to stop the previous flow. That is, when there is a flow of cold water for example the prior art structure required that the flow be interrupted and the mechanism moved so as to bring the elements of the faucets to a position that will permit the flow of a different type of water, such as lukewarm water.

An important object of this invention is to provide an improved mixing valve for two different liquids. The components of this invention form a single unit with an interchangeable cartridge or selecting sleeve that is attached for easy assembly or disassembly onto and from water faucets in vats, tubs, basins and the like.

The mixing valve unit of the present invention provides for the mixing of hot and cold water directly within the flow passages inside the body of the unit. This result is achieved without limiting the discharge to that of only hot water or only cold water.

Another object of this invention is to provide a valve that permits variation in the type of water discharged without having to close the faucet. This result is achieved by rotating an external knob that is coupled to the internal selecting element. When the external knob is rotated the internal selecting element is placed in communication with one or the other or both of the inlets of hot and cold water. The hot and cold water inlets are independent of each other and are connected through the selecting element only when the liquid flow is mixed.

Figure 1:
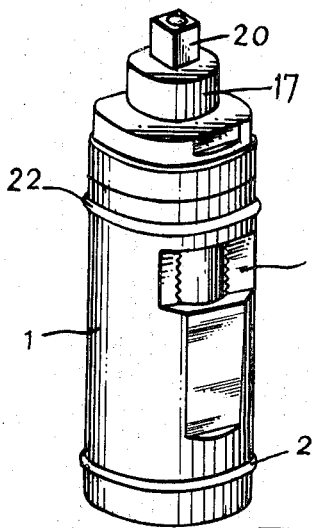
FIG. 1 is a perspective view of the interchangeable mixing valve comprising the present invention.
Figure 2:
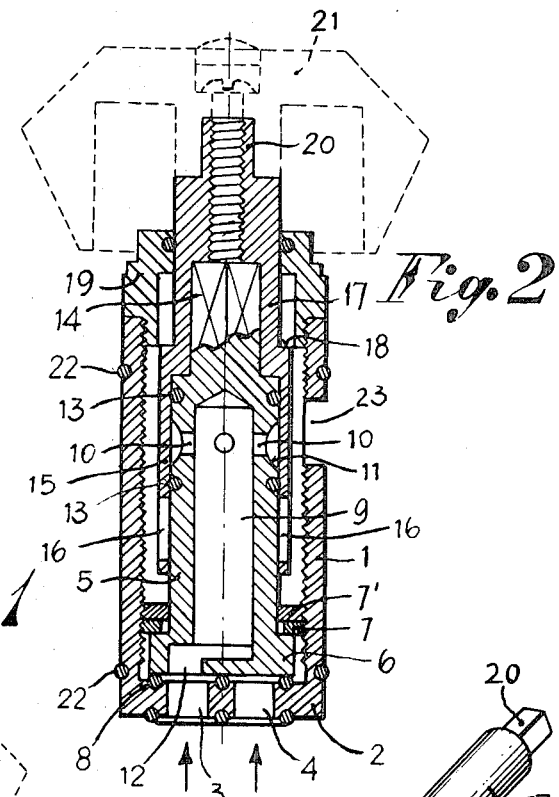
FIG. 2 is a longitudinal, sectional view of the apparatus shown in FIG. 1 in the valve closed position.

As shown in the drawing, the present invention is comprised of a sleeve member 1 having internal threads and a bottom wall 2. Two fluid inlets 3 and 4 for hot and cold water respectively are provided in the bottom wall 2.

Internally of the sleeve there is provided a selector member 5 having a lower flange 6 on which are mounted externally threaded washer or disclike members 7-7' that mate with the internal threads of the sleeve 1 so as to guide the selector member 5 into a working position. The bottom surface of the flange 6 is in opposition to the inside surface of the bottom wall 2 and there is captured therebetween seal gaskets 8 for the water inlets 3 and 4.

Selector member 5 is provided with an axial bore 9 which, at its upper end, communicates with the outside thereof through a plurality of radial openings 10 and recessed areas 11. A pair of seal gaskets 13 are provided on the outside of the selector member 5 above and below the openings 10 and 11. The lower part of the selector member 5 communicates with the outside through an arcuate slot 12 that is laterally displaced or offset with respect to the longitudinal axis of the selector member 5. When the selector member 5 is moved angularly the arcuate slot 12 is brought into communication with one or both of the openings 3 and 4 for the intake of water.

The upper portion of the selector member 5 is provided with a noncircular pivot portion 13, preferably square as illustrated. A bushing 15 is mounted on the pivot 14 and surrounds the selector member 5. The bushing member 15 which is hollow is axially displaceable relative to the selector member and is provided with a plurality of longitudinally extending slots 16. Further, the bushing member 15 is provided with a cylindrical extension 17 which together with the outer portion of the lower part thereof defines a transverse interface 18. Another bushing 19 which is threadably engaged with the sleeve 1 supports the extension 17 to provide a unitary structure. Portion 20 projects from extension 17 in order to support a handle or wheel 21 that is used to control the functioning of the faucet.

The mixing valve described hereinabove is mounted in any suitable manner to the body of the faucet (not shown) so that the cold and hot water inlets 3 and 4 are in communication with the source of cold and hot water respectively. There is also provided sealing means 22 on the outside of the sleeve 1 to provide a seal between the faucet body and the sleeve.

By rotating the handle 21 the bushing 15 moves angularly. Consequently, the selector member 5 also moves angularly so that the slot 12 at the bottom thereof communicates with one or the other or both of the openings 3 and 4. The axial bore 9 in the selector member 5 provides direct passage for the fluid with leakage being prevented by the gaskets 13. When the handle 21 is moved upwardly, it carries with it the bushing 15 so as to move the slots 16 into communication with the transverse openings 10 and 11 of the selector element 5. This permits the flow of liquid into the sleeve 1. From there the liquid is discharged through a chordal slot 23 provided in the wall of the sleeve 1, preferably in substantially the same location as the outlet of the faucet.

Accordingly, the opening of the faucet is achieved by moving the handle 21 in an axial direction and carrying with it the bushing 15. Different flow rates are provided by varying the uncovering extent of the slots 16 in relationship to the radial openings 10 and 11. Maximum upward displacement of the handle 21 is limited by the interface 18 coming into abutment with an internal shoulder on the bushing 19.

Figure 3:
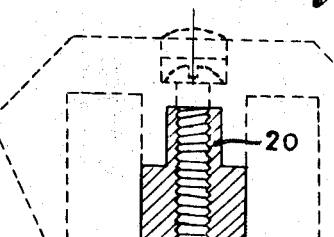
FIG. 3 is a longitudinal, sectional view similar to FIG. 2 showing the apparatus in the valve open position.
Figure 3:
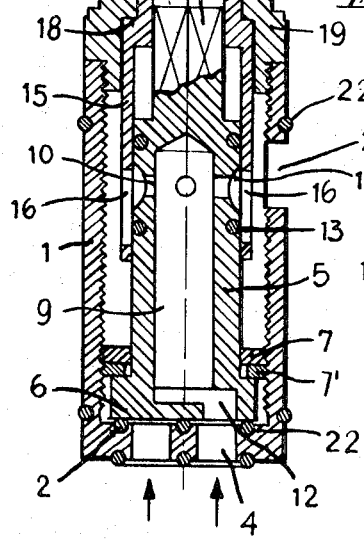
Figure 5:
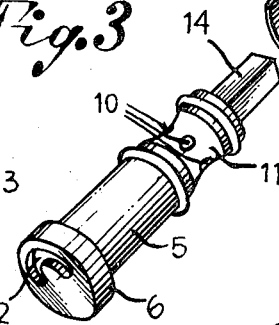
FIG. 5 is an exploded perspective view of two of the components of the present invention.
Figure 4:
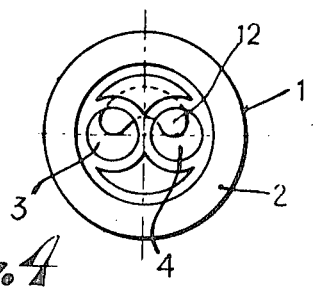
FIG. 4 is a bottom plan view of the present invention.

As stated above a separate flow of cold water or hot water or a mixture thereof is provided by the positioning of slot 12 with respect to the cold and hot water inlets 3 and 4. It is not necessary to close off the faucet in order to displace the selector element 5 nor is it necessary to move the handle 21 once it is axially displaced upwardly as shown in FIG. 3.

It should be clearly understood that, without departing from the spirit of the invention, the function of the sleeve 1 could be incorporated in the body of the faucet itself. In addition, it should also be understood that while reference has been made to the mixing of hot and cold water, the present invention is equally applicable to the mixing of different liquids of almost any type.

I claim:

1. A mixer valve for two different fluids, said valve comprising the combination of:
   a. a selector member having outlet port means and an inlet port means arranged to be selectively moved into communication with either one or both of the sources of different fluids;
   b. means for limiting said selector member to angular movement; and
   c. a first hollow bushing member surrounding said selector member, said bushing member having discharge means and means for closing the outlet port of said selector member, said bushing member being axially movable between valve open and valve closed positions.

2. A mixer valve in accordance with claim 1 further including a tubular sleeve member having fluid discharge means and two independent inlet port means adapted to be placed in communication with the source of the two different fluids, said sleeve member surrounding said selector member.

3. The mixer valve in accordance with claim 2 wherein said inlet ports of said tubular sleeve member are on a common radius and said inlet port means of said selector member is arcuate, the length of said arcuate inlet port extending sufficiently to be in simultaneous communication with both said sleeve member inlet ports.

4. The mixer valve in accordance with claim 2 wherein said selector member includes an axial bore in communication with said inlet port means and said outlet port means thereof, said outlet port means of said selector member comprising a plurality of radially extending openings.

5. Mixing valve in accordance with claim 4 further including first gasket means interposed between adjacent confronting surface of said selector member and said bushing member, said first gasket means being positioned on both sides of a transverse axis defined by said outlet port means of said selector member.

6. The mixer valve in accordance with claim 2 wherein said sleeve member is internally threaded and said means for limiting said selector member to angular movement comprises at least one threaded disclike member in mating engagement with the threads of said sleeve member, said selector member having a portion upon which said disclike member is seated to thereby prevent axial movement of said selector member.

7. The mixer valve in accordance with claim 2 wherein in the closed position of said mixer valve the wall of said first hollow bushing member covers said outlet port means of said selector member, said first hollow bushing member having a plurality of slots in the wall thereof adapted to be positioned over said outlet port means of said selector member when said mixer valve is in the open position.

8. The mixer valve in accordance with claim 2 wherein said selector member includes a noncircular end portion in mating engagement with a similarly shaped portion of said first hollow bushing member whereby said first hollow bushing member and said selector member are adapted to move angularly in unison and said first hollow bushing member is adapted to move axially with respect to said selector member.

9. The mixer valve in accordance with claim 2 further including a second bushing member threadably engaged with said tubular sleeve member said second bushing member surrounding one end portion of said first bushing member and having means cooperating therewith for limiting the axial movement of said first bushing member.

10. The mixer valve in accordance with claim 2 wherein said inlet port means of said tubular sleeve member are located in a transverse end wall thereof that is in opposition to the end surface of said selector member containing said inlet port means thereof, there being further included second gasket means interposed between said opposing surfaces.